May 17, 1960 A. E. BLACKMAN 2,936,519

MANUFACTURE OF INTERDIGITAL METAL STRUCTURES

Filed March 20, 1957

INVENTOR
ALAN EDWARD BLACKMAN
BY Kirschstein, Kirschstein & Ottinger
ATTORNEYS

United States Patent Office
2,936,519
Patented May 17, 1960

2,936,519

MANUFACTURE OF INTERDIGITAL METAL STRUCTURES

Alan Edward Blackman, Enfield, England, assignor to The M-O Valve Company Limited, London, England Application March 20, 1957, Serial No. 647,288
Claims priority, application Great Britain March 28, 1956
3 Claims. (Cl. 29—418)

Figures 1, 2, 3, 4, 5, 6, 7, 8:
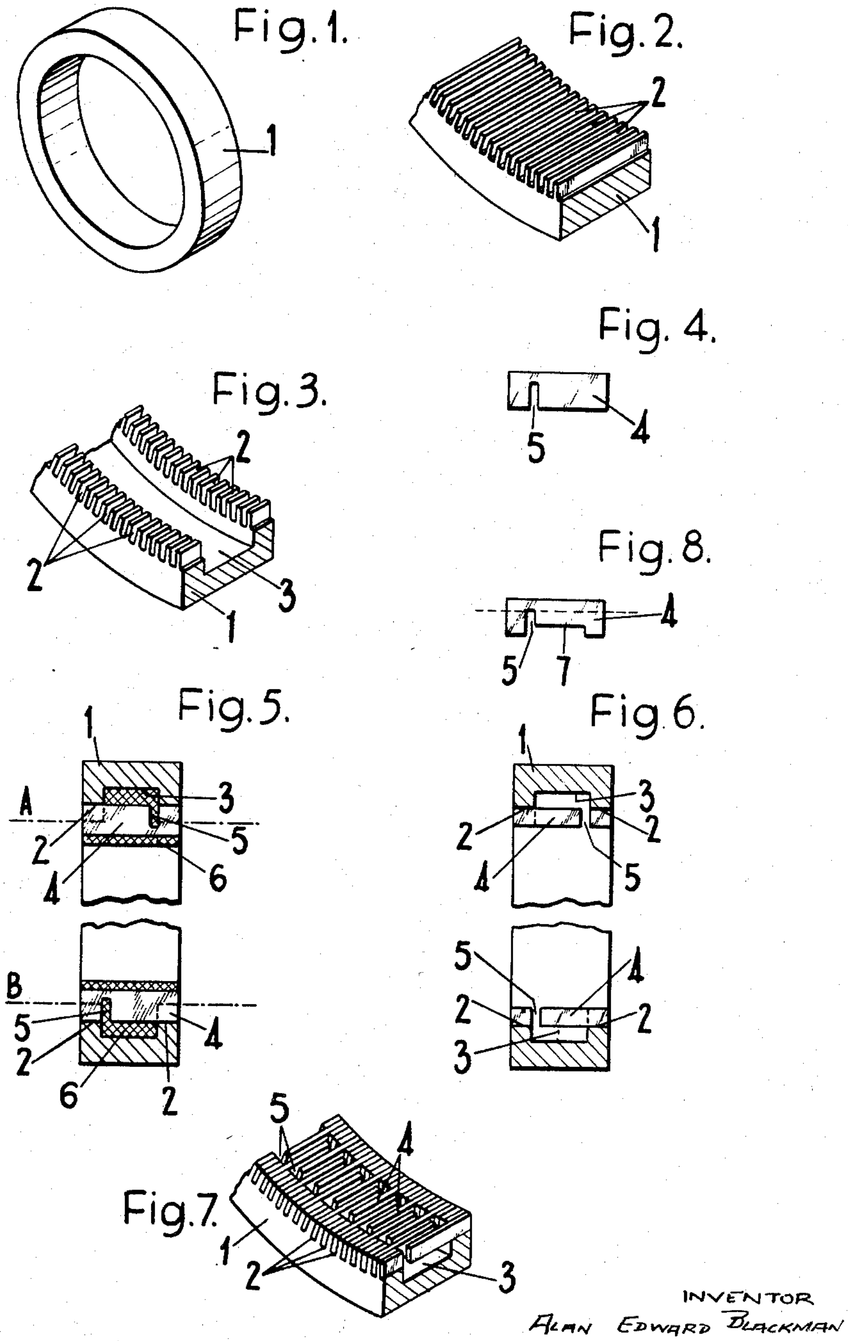

This invention relates to the manufacture of interdigital metal structures of the kind in which metal fingers project in a predetermined pattern from different sides of a channel formed in a metal base member, the fingers extending, usually parallel to each other, from one side of the channel, to which side they are electrically conductively attached, towards the other side, but being spaced from said other side, from each other, and from the bottom of the channel.

Such structures are used, for example, as wave-retarding arrangements in electrical travelling wave devices, such as the so-called "backward wave" oscillator, and the invention is especially concerned with the manufacture of interdigital structures for such use, although the method of manufacture in accordance with the invention can be used for providing interdigital structures of the kind referred to for other purposes if required.

The usual pattern in which the metal fingers are required to be arranged is that adjacent fingers are parallel to each other and project from opposite sides of the channel, and the fingers are usually required to extend across the channel perpendicularly to its longitudinal axis; these requirements are, however, not essential to the present invention, which can readily be applied to produce different interdigital patterns and to provide fingers inclined to the longitudinal axis of the channel at an angle of less than 90 degrees if required.

Where a large number of closely spaced fingers are required and the dimensions are relatively small, as in travelling wave devices where the operating wavelength is much less than 10 centimetres, the manufacture of an interdigital structure of the kind referred to by known methods is tedious and difficult to effect with a high degree of accuracy, and this is especially the case where the structure is formed on the inner surface of an annular cylindrical metal base member, as is sometimes required.

The object of this invention is to provide a novel method of manufacturing interdigital structures of the kind referred to that is relatively simple to effect with high accuracy even when the base member is of annular cylindrical form.

According to the invention the manufacture of an interdigital metal structure of the kind referred to includes the steps of forming the channel in the metal base member with its sides slotted for receiving finger blanks each fitting into two slots, one on each side of the channel, aligned for supporting the blank in the direction in which the finger is required to lie, fixing into each pair of aligned slots, with its lower edge spaced from the bottom of the channel, a finger blank in the form of a metal plate having a cut-out, such as a slot, extending from its lower edge part way towards its top edge, said cut-outs being located in the plates so as to define the required finger pattern, embedding the finger blanks in a dispersible solid support medium which will hold them in position whilst the top parts thereof are removed, removing the top parts of the embedded blanks to a depth below the top of the said cut-outs so as to produce the required finger pattern by the separation of each blank into two spaced parts, and dispersing the said support medium.

The fingers should in general be metallically united with the sides of the channel, and this is preferably effected by metalically uniting (for example by brazing, soldering or welding) the finger blanks in position in the aligned slots of the channel before embedding them in the dispersable support medium, although in some cases the finger blanks may be arranged to be a tight fit in the slots and the fingers left after the removal of the top part of the embedded structure and the dispersal of the support medium finally metallically united with the sides of the channel.

The initial formation of the slotted channel in the base member can conveniently be effected by initially forming in a blank base member, preferably simultaneously by a single machining or tooling operation when parallel slots are required, a plurality of slots having the directions required for the pairs of aligned slots, embedding these slots in a dispersible solid support medium, cutting a channel through the embedded slots so as to form the required channel with slotted sides, and dispersing the support medium.

For either embedding step the dispersible solid support medium can conveniently be a heat-dispersible synthetic resin, such as polymerised ethylene or a methyl methacrylate polymer. Other forms of support medium, for example type metal, or other forms of dispersal, for example by treatment with a solvent or chemical reagent, can also be used if required.

The invention will be further explained in describing, by way of example, one embodiment of it which is illustrated in the accompanying schematic drawing, in which Figure 1 shows in perspective an annular cylindrical blank on the inner surface of which the interdigital structure is to be formed, Figures 2 and 3 show fragmentary views of the base member illustrating different steps in the formation of a channel having aligned slots in its sides, Figure 4 shows a side view of one of the finger blanks to be inserted in the slots, Figure 5 shows a section through the base member at right angles to the longitudinal axis of the channel with the finger plates fixed in position and covered by the support medium, Figure 6 shows the section of Figure 4 after removal of the top parts of the finger plates and dispersal of the support medium, Figure 7 shows a fragmentary perspective view of the completed structure, and Figure 8 shows a modified form of finger blank suitable for use in a modified form of the method described.

Referring now to the drawing, an annular cylindrical copper blank 1 (Figure 1) has its inner face formed with a plurality of parallel transverse slots 2 in a single machining operation (Figure 2).

The spaces between the slots are then filled with a heat dispersible synthetic resin, such as polymerised ethylene, which extends as a layer (not shown) over the top of the slots. A channel 3 is then cut through this layer, through the slots, and into the base member 1 in a single machining operation, after which the synthetic resin is dispersed by heat (Figure 3).

Into each pair of aligned slots is fitted a finger blank in the form of a rectangular plate 4 as shown in Figure 4, the plate having a cut-out in the form of a rectangular slot 5 extending into the plate from one side to a depth equal to the depth required for the final finger.

The finger blanks are inserted lengthwise into the aligned slots 2 with the edge containing the cut-out lowermost, i.e. nearer the bottom of the channel, and with adjacent plates having their cut-outs at opposite sides of the channel. The cut-outs are so positioned in the finger blanks that one side of each cut-out substantially coincides with the side of the channel from which the end of the finger formed from the blank is required to be spaced. The blanks 4 are brazed in position and the spaces between them, and the channel 3, then filled with a heat-dispersible synthetic resin, such as polymerised ethylene, represented by the unshaded part 6 in Figure 5, which forms a layer over the top of the blanks.

The top of the structure is then machined away to a depth at which the closed ends of the slots 5 are cut away, as at A and B in Figure 5, and the resin filling is dispersed by heat to leave the required interdigital structure, as indicated in section in Figure 6 and in fragmentary perspective view in Figure 7.

It will be appreciated that the interdigital structure need not necessarily extend the whole way round the metal annulus 1, although it can readily be arranged to do so if required.

It will also be appreciated that in some cases the channel formed in the metal base member, for example in the stage illustrated in Figure 3, might extend only to the depth of the slots. In such a case the required spacing of the lower edge of the finger blanks from the bottom of the channel can be obtained by suitably stepping the centre part of the lower edges of the blanks from the end parts which fit into the channel slots, as indicated at 7 in the modified finger blank shown in Figure 8, where the transverse dotted line indicates the depth of cut required for forming the finger.

A particular advantage resulting from the method of manufacture in accordance with the invention is that the fingers may readily be arranged to be of a different metal from that of the base member in which the slotted channel is formed; for example, for use in a backward wave oscillator the base member and some of the fingers might be of copper, while those fingers remote from the output connection might be of a metal having high frequency attenuation properties. Also the fingers need not all be of the same metal as each other; for example those fingers near the cathode which are subjected to intense heat or electron bombardment in operation might be made of a refractory metal such as molybdenum.

I claim:

1. The manufacture of an interdigital metal structure having metal fingers projecting in a predetermined pattern from each of the two different sides of a channel formed in a metal base member, with each finger extending part way across the channel towards the side from which it does not project, which manufacture includes the steps of forming the channel in the metal base member with its sides slotted for receiving finger blanks each fitting into two slots, one on each side of the channel, aligned for supporting the blank in the direction in which the finger is required to lie, fixing into each pair of aligned slots, with its lower edge spaced from the bottom of the channel, a finger blank in the form of a metal plate having a cut-out which extends from its lower edge part way towards its top edge, said cut-outs in some plates being at one side of the channel and in the other plates at the other side of the channel so as to define the required path of finger interlacing, bonding the finger blanks to the sides of the channel, embedding the finger blanks in a moldable medium which hardens to form a dispersible solid support medium which will hold them in position whilst the top parts are removed, removing the top parts of the embedded blanks to a depth below the top of the said cut-outs so as to produce the required finger pattern by the separation of each blank into two spaced parts, and dispersing the said support medium.

2. The manufacture according to claim 1 wherein the support medium in which the finger blanks are embedded is a moldable and heat-dispersible synthetic resin.

3. The manufacture according to claim 1 of an interdigital metal anode for a backward wave oscillator, which anode is of annular cylindrical shape and is formed on its inner surface with a channel, and with fingers extending from different sides part way across the channel, by the steps set out in claim 1.

References Cited in the file of this patent

UNITED STATES PATENTS

| | | |
|---|---|---|
| 2,121,597 | Karl | June 21, 1938 |
| 2,663,928 | Wheeler | Dec. 29, 1953 |
| 2,674,784 | Roberts et al. | Apr. 13, 1954 |
| 2,696,658 | Polard | Dec. 14, 1954 |

FOREIGN PATENTS

| | | |
|---|---|---|
| 234,451 | Great Britain | July 5, 1926 |